United States Patent [19]

Hoch et al.

[11] Patent Number: 4,921,377
[45] Date of Patent: May 1, 1990

[54] CUTTER AND DRIVE GEAR ASSEMBLY FOR DRESSING WELDING ELECTRODE TIPS

[76] Inventors: Norman J. Hoch; Arno Rabin, both of Hi-Tech Industries, Inc., 21850 Wyoming Pl., Oak Park, Mich. 48237

[21] Appl. No.: 367,986

[22] Filed: Jun. 19, 1989

Related U.S. Application Data

[63] Continuation of Ser. No. 235,217, May 23, 1988, Pat. No. 4,892,448.

[51] Int. Cl.$^5$ ............................................. B23C 5/02
[52] U.S. Cl. ...................................... 409/140; 407/55; 407/56; 408/211
[58] Field of Search ............... 409/140, 181, 175, 139, 409/138; 408/130, 234, 118, 227, 211; 219/119; 407/9, 30, 31, 33, 51, 55, 56, 65

[56] References Cited

U.S. PATENT DOCUMENTS

| | | | |
|---|---|---|---|
| 2,284,483 | 5/1942 | Whitesell | 408/23 X |
| 2,286,931 | 6/1942 | Radeke | 407/33 X |
| 2,930,289 | 3/1960 | Swarts | 409/181 |
| 3,820,437 | 6/1974 | Dyer | 409/175 |
| 4,578,005 | 3/1986 | Fuse | 407/9 X |

FOREIGN PATENT DOCUMENTS 624590 6/1949 United Kingdom ................ 409/140

Primary Examiner—William Briggs
Attorney, Agent, or Firm—Dykema Gossett

[57] ABSTRACT

A cutter and gear assembly for simultaneously dressing a pair of spaced aligned welding electrode tips comprise a housing with a power-rotated gear journaled thereon for rotation upon a first axis and having an axial bore at one end terminating in an annular seating flange and adjacent its other end having an annular groove. A dressing tool cutter assembly is axially nested within the gear, bears against the seating flange and has a plurality of axially elongated arcuate drive tangs nested within corresponding drive grooves within the bore. A snap ring is anchored within the annular groove and retainingly engages the cutter assembly. The cutter assembly includes a pair of symmetrical outwardly opening cutting elements upon its opposite sides, each cutting element including a plurality of angularly related inclined cutting edges having a profile corresponding to the contour of a pair of aligned electrode tips adapted for axial projection into and against the cutting elements upon the first axis.

6 Claims, 3 Drawing Sheets

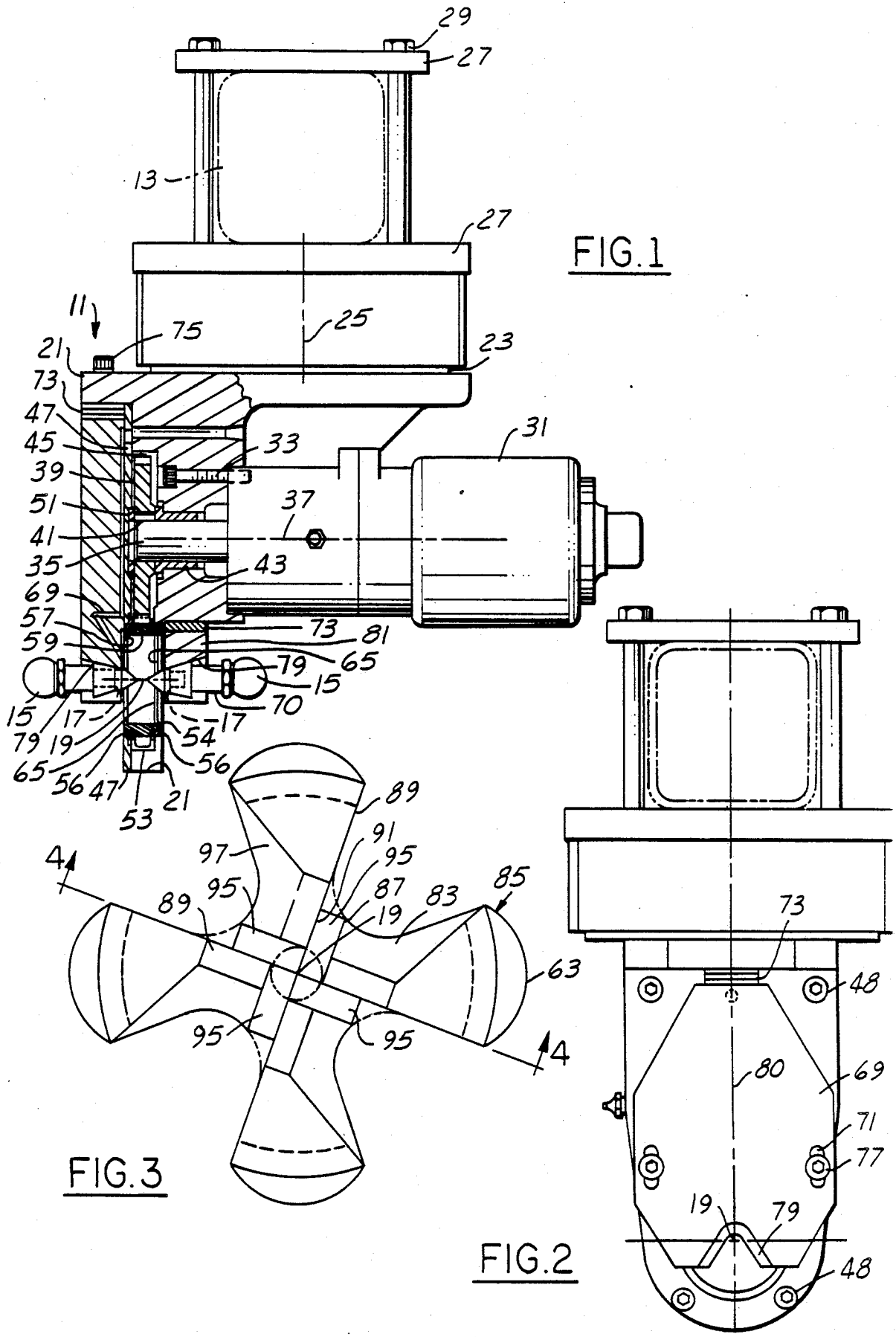

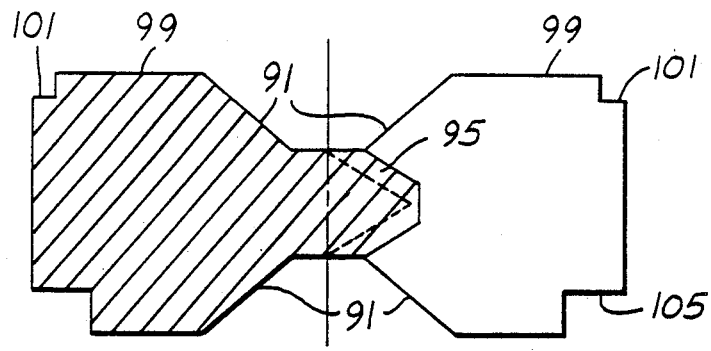
FIG.4
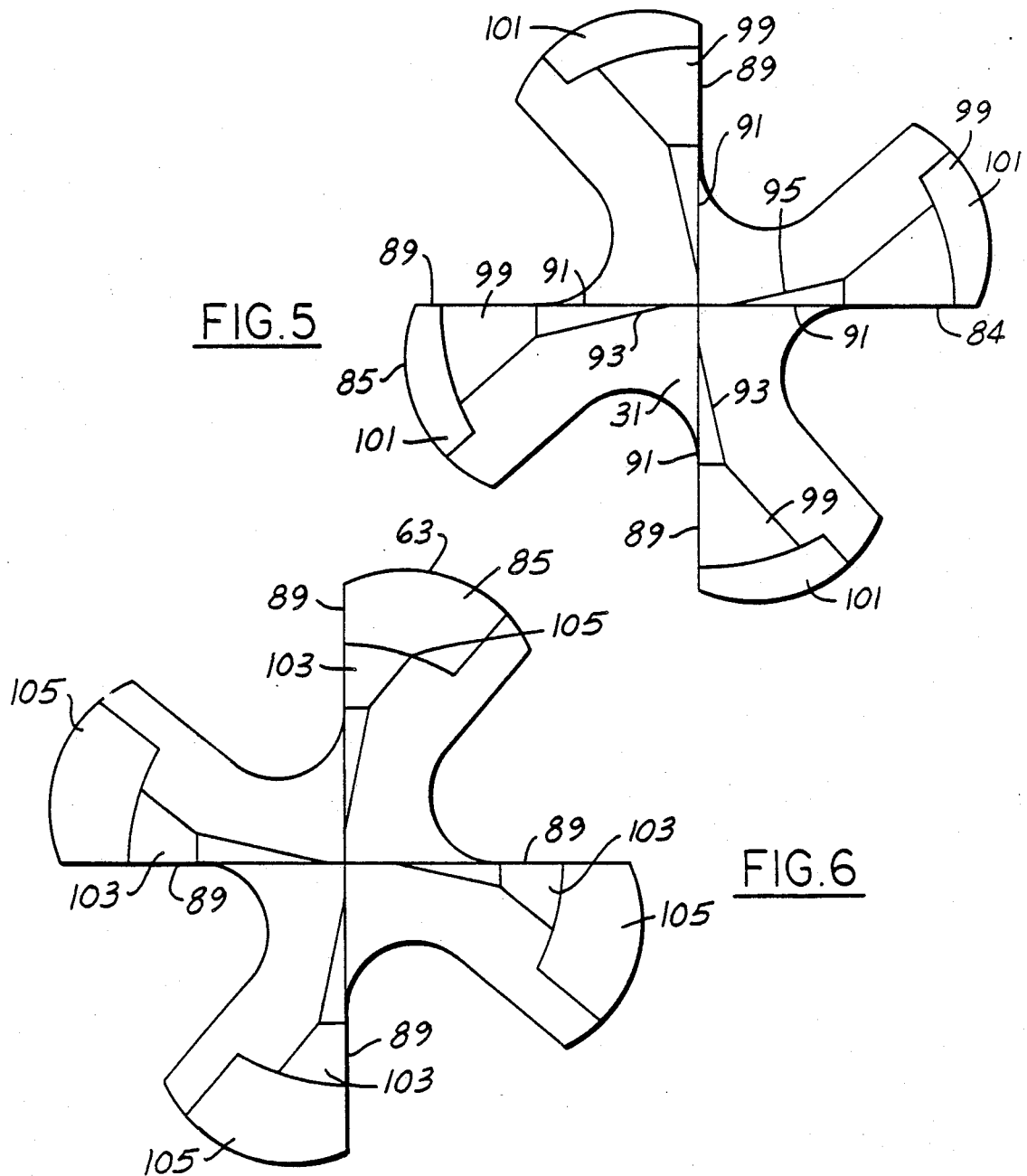
FIG.5
FIG.6

CUTTER AND DRIVE GEAR ASSEMBLY FOR DRESSING WELDING ELECTRODE TIPS

This is a divisional of co-pending application Ser. No. 07/235,217 filed on Aug. 23, 1988 U.S. Pat. No. 4,892,448.

FIELD OF INVENTION

This invention relates to dressing of welding electrode tips and more particularly to a cutter and gear drive assembly for simultaneously dressing a pair of spaced aligned electrode tips.

BACKGROUND OF THE INVENTION

In use, as welding electrodes become worn and out of shape, poor welds and no welds result, welds are non-uniform, take longer and are of poor quality. Previously, the welding apparatus is shut down, and the individual electrodes are, as an example, either (a) removed from the welding guns for replacement and for manual dressing or reshaping or (b) are automatically dressed in place on the welding equipment without removal therefrom. Previously, hand tools and automatic dressers have been used to dress worn electrodes. Tips have also been dressed in lathes and drill presses, resulting in considerable down-time and lack of uniformity of the dressed welding tip.

SUMMARY OF THE INVENTION

An important feature of the present invention is to provide an improved cutter and gear assembly adapted for simultaneously dressing a pair of spaced aligned welding electrode tips without removing them from their welding gun.

As another feature, the present cutter and gear assembly includes a housing with a power-rotated hollow gear journaled thereon for rotation upon a first axis, the gear having an axial bore terminating at one end in an annular seating flange and adjacent its other end having an annular groove. A plurality of angularly spaced peripheral drive grooves are formed in the gear extending from the flange along the bore. A unit-dressing tool cutter assembly is axialy nexted within the gear bearing against the seating flange and has a plurality of axially elongated arcuate drive tangs nested within the drive grooves in the gear together with a snap ring anchored within the annular groove to retainingly engage the cutter assembly within the gear for rotation in unison.

As an important feature, the present cutter and gear assembly includes a pair of symmetrical outwardly opening cutting elements on its opposite sides with each cutting element including a plurality of angular related inclined cutting edges having a profile corresponding to the contour of a pair of aligned electrode tips adapted for axial projection into and against the cutting elements upon the first axis.

As an important feature, the present cutter and gear assembly includes a central body having an axis of rotation corresponding to the first axis wherein the pairs of cutting elements includes a plurality of right angularly related blades which extend radially and axially of the body and terminate in the drive tangs.

A still another feature of the cutter and gear assembly, one side of each blade has a planar radial flat surface and upon its other side a pair of converging relief surfaces, there being a pair of converging elongated inwardly inclined cutting edges upon the opposite ends of each radial flat surface.

As still another feature of the present invention, there is provided a unit dressing tool cutter having four or more axially elongated arcuate drive tangs and a pair of symmetrical outwardly opening cutting elements on its opposite sides, with each cutting element including a plurality of angularly related inclined cutting edges having a profile corresponding to the contour of a pair of aligned electrode tips adapted for axial projection into and against the cutting elements.

These and other features and objects will be seen from the following specification and claims in conjunction with the appended drawings.

THE DRAWINGS

FIG. 1 is a partly sectioned front elevational view of the electrode dresser which incorporates a cutter and gear assembly for simultaneously dressing a pair of spaced aligned welding electrode tips.

FIG. 2 is an end elevational view of the electrode dresser.

FIG. 3 is a plan view of the top surface of the present dressing tool cutter or cutter assembly.

FIG. 4 is a fragmentary section taken in the direction of arrows 4—4 of FIG. 3.

FIG. 5 is a top view of the top side of the cutter assembly.

FIG. 6 is a bottom view of the bottom side of the cutter assembly.

DETAILED DESCRIPTION OF AN EMBODIMENT OF THE INVENTION

Figure 7:
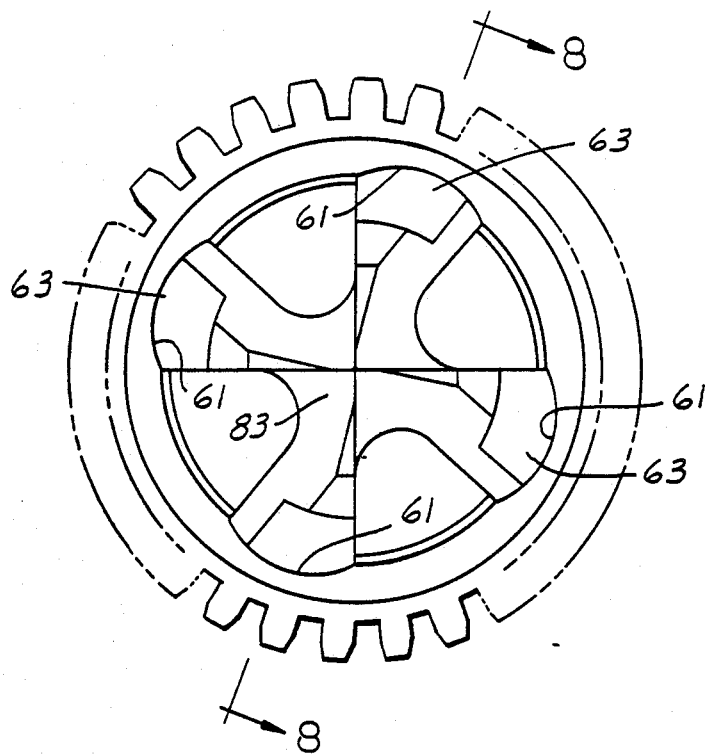
FIG. 7 is a side view of the drive gear with the cutter assembly inserted therein to form the cutter and gear assembly.

Referring to the drawings, FIGS. 1 and 2, a welding electrode dressing machine or dresser is generally indicated at 11, and includes a robotic supporting arm or tubing 13 to which have been applied a pair of weld electrodes 15, fragmentarily shown, normally mounted on some portion of the robotic arm 13 and terminating in the electrode tips 17 arranged upon the first axis 19.

The present welding electrode dresser 11 includes a housing 21 having a mount 23 rotatably adjustable throughout 360 degrees with respect to axis 25 and upon the bracket 27. The bracket 27 is secured by suitable fasteners 29 to a portion of the robotic arm tubing 13.

Transversely extending air motor 31 is mounted upon one side of the housing 21 is secured thereto by a plurality of fasteners 33 and includes a drive shaft 35 arranged upon a longitudinal axis 37 parallel and spaced from the first axis 19.

Drive gear 39 is keyed at 41 upon the end of drive shaft 35 which is supported on a flange bearing 43 located within the housing 21. A thrust bearing 51 is mounted upon the front cover 47 which is secured to the housing 21 by a plurality of fasteners 48.

Work gear 53, sometimes referred to as a power-rotated hollow gear, is in mesh with drive gear 39 and includes a hollow axial hub 54 at its opposite ends journaled and supported within the corresponding flange berings 56 nested within the cover 47 and the housing 21, FIG. 1.

The present dressing tool cutter assembly as a unit is designated at 55 in FIG. 1 and is shown in further detail in FIGS. 3, 4, 7, 8 and 9.

Work gear 53 has an axial bore 59 defined by hub 54 and terminates at one end in the annular cutter seating flange 57 against which the work gear 53 is positioned and retained. Bore 59 extends to the other end of hub 54, and inwardly of the end there is provided an annular groove 65 adapted to receive the snap ring 67, FIG. 8, for retainingly engaging the opposite side of the dressing tool cutter assembly 55 upon the interior of the work gear 53.

A rotative drive relation is established between work gear 53 and dressing tool cutter assembly 55. For this purpose, within the bore 59 and extending from the seating flange 57 there are arranged a series of spaced axial grooves 61 with corresponding ridges which extend to the outer end of the bore 59 and are adapted to receive the corresponding right angularly related tangs 63 upon the outer peripheral ends of the blades forming a part of the cutter assembly 55.

Upright adjustable guide block 69, having a pair of adjusting slots 71 therethrough, is mounted upon the front face of housing 21 and is adjustably secured thereto by a pair of fasteners 77. The adjustable spacing of the guide block 69 relative to the housing 21 is facilitated by the use of a plurality of shims 73 interposed between the upper end of the guide block 69 and the housing 21 and retained by the fastener 75 which extends down through the housing and into guide block 69 for final securing of the guide block 69 upon the housing 21.

Arranged upon the lower end of guide block 69 is the downwardly extending and outwardly inclined slotted guide surfaces 79, FIGS. 1 and 2, which are arranged upon a central axis 80 and which extend at right angles to the first axis 19.

An additional adjustable second guide block 81 is secured to a rear portion of housing 21 rearwardly of guide block 69 upon the opposite side of the work gear 53 and is suitably secured to the housing 21 with one or more shims 73 interposed as required. The second guide block 81 has an additional and symmetrical downwardly extending and outwardly inclined slotted guide surface 79. The guide surfaces 79 are adapted to supportably receive the pair of electrode tips 17 which are removably connected with the robotic welding arms 15, fragmentarily shown in FIG. 1, and normally in a spaced relation and in alignment with the first axis 19 for registry with the axis of rotation of the dressing tool cutter assembly 55 which is adapted to simultaneously dress the pair of spaced aligned welding electrode tips 17.

DRESSING TOOL CUTTER ASSEMBLY

The present dressing tool cutter assembly 55 includes a central body 83, FIGS. 3, 7, 8 and 9, adapted for rotation upon the first axis 19, FIGS. 1 and 3, and includes in the illustrative embodiment a plurality, namely four, right angularly related axial blades 85 further shown in FIGS. 5 and 6. Between the adjacent blades 85 at the central body 83 there is provided a concave radius 87 therebetween to facilitate mounting of the cutter assembly 55 upon a fixturing device for holding the cutter for machining.

Each of the blades 85 includes a planar radial end face 89 which towards its central portion terminates in the sharp cutting edge 91, in the illustrative embodiment, inclined at approximately 45 degrees inwardly.

The present cutter assembly 55 includes a pair of symmetrical outwardly opening cutting elements upon its opposite sides such as shown in FIGS. 5 and 6 and wherein each of the pair of cutting elements includes a plurality of angularly related inclined cutting edges 91 which have a profile corresponding to the contour of a pair of aligned electrode tips such as the tips 17 shown in FIG. 1. On the trailing side of each cutting edge there is provided a positive rake clearance 93 in the range of 2 to 8 degrees. Each of the respective cutting edges 91 where it joins the central body 83 terminates in a tapered positive rake 95 for chip clearance having an angle of 31 degrees, approximately. These positive rakes 95 are right angularly related, such as shown in FIG. 3, and are inclined downwardly and inwardly at an angle of 31 degrees with respect to a plane passing at right angles through the axis of rotation 19. Each of the respective blades 85 upon its opposite side to the cutting edge 91 has a tapered relief surface 97 to facilitate the cutting action and chip removal during the dressing of the pair of aligned electrode tips 17 shown in FIG. 1.

The present cutter assembly 55 includes a pair of symmetrical outwardly opening cutting elements which are generally conical in shape with one arranged upon opposite ends of the cutter assembly being a mirror image of the first set of cutting elements such as shown in FIGS. 5 and 6.

As shown in FIG. 5, the respective blades 85 have top surfaces 99 which are coplanar and lie in a plane at right angles to the first axis 19. Each of the individual top surfaces 99 terminates in a peripheral clearance ledge or relief 101 in cooperative registry with the seating flange 57 upon the inside of the work gear 53. The outwardly opening cutting elements, namely the shapr cutting edges 91, clearly shown in FIG. 5, form one of pair of symmetrical outwardly opening cutting elements, with the other of the cutting elements shown in FIG. 6.

Figure 8:
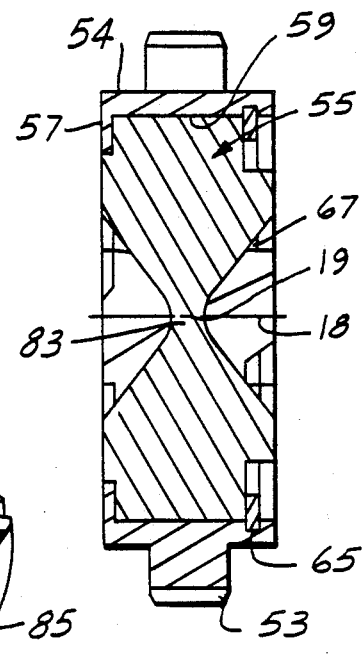
FIG. 8 is a cross-section of the cutter and gear assembly taken in the direction of arrows 8—8 of FIG. 7.
Figure 9:
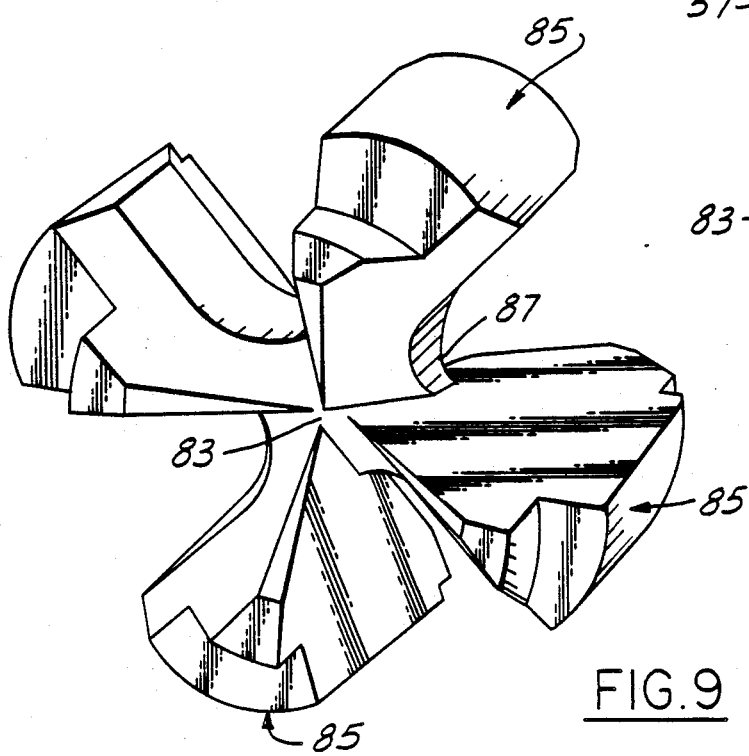
FIG. 9 is a front perspective view of the unit cutter assembly.

Referring to FIG. 6, there is shown at the opposite ends of the respective blades 85 a series of bottom surfaces 103 which are coplanar and lie in a plane at right angles to the first axis 19 and at their outer ends having a peripheral clearance ledge 105 adapted to cooperatively receive the retaining snap ring 67, FIG. 8, for axially retaining the cutter assembly 55 within the work gear 53.

Once the unit dressing tool cutter assembly 55 has been nested and retained within the work gear 53, the respective top and bottom surfaces 99 and 103 are substantially enclosed within the profile of the work gear 53.

The present unit dressing tool cutter assembly 55 includes a pair of symmetrical outwardly opening cutting elements on its opposite sides, FIG. 8 and FIG. 1, adapted to cooperatively receive for simultaneous dressing a pair of spaced aligned welding elctrode tips 17, FIG. 1. The respective outwardly opening cutting elements are of a general conical shape, as further shown in FIGS. 3, 4, 5, 6 and 8. As shown in the drawings, one side of each blade 85 has a planar radial flat surface 89 and upon its other side a pair of converging relief surfaces 97 defining with the flat surfaces at one edge thereof the pair of converging elongated inwardly inclined cutting edges 91 upon the opposite ends of each radial flat surface and terminating in the body. The respective relief surfaces thus define a single inclined cutting edge 91 for each of the symmetrical outwardly opening cutting elements arranged upon opposite sides of the cutter assembly 55. Thus, each blade 85 forms a part of the corresponding symmetrical outwardly opening cutting elements upon the opposite sides of the tool cutter assembly 55.

Having described our invention, reference should now be had to the following claims.

We claim:

1. A unitary dressing tool cutter assembly comprising a body having a first axis of rotation and four or more axially elongated arcuate drive tangs being receivable and fixed in complementary drive recesses in a hollow power-rotated gear;

said body having a pair of sides through which said first axis extends; and pairs of symmetrical outwardly opening cutting elements on the sides of said body, each cutting element including a plurality of angularly related inclined cutting edges having a profile corresponding to the contour of a pair of aligned electrode tips adapted for axial projection into and against said cutting elements;

said pairs of cutting elements including a plurality of right angularly related gear blades extending radially and axially of said body and terminating in said drive tangs.

2. In the cutter assembly of claim 1, each blade having a pair of sides, one side of each blade having a planar radial flat surface and the other side of each blade having a pair of converging relief surfaces, there being a pair of converging elongated inwardly inclined cutting edges upon the opposite ends of each radial flat surface terminating in said body.

3. In the cutter assembly of claim 2, each cutting edge having a trailing rake angle of 2 to 8 degrees.

4. In the cutter assembly of claim 2, there being a positive clearance rake surface in said body adjacent the junction of each cutting edge therewith at an angle of 31 degrees, approximately.

5. In the cutter assembly of claim 3, there being a positive clearance rkae surface in said body adjacent the junction of each cutting edge therewith at an angle of 31 degrees, approximately.

6. In the cutter assembly of claim 1, each of said gear blades having upon its opposite ends coplanar flat top and bottom portions, with axially offset peripheral clearance ledges adapted to cooperatively receive the seating flange and snap ring respectively of a hollow power-rotated gear.

* * * * *

UNITED STATES PATENT AND TRADEMARK OFFICE
CERTIFICATE OF CORRECTION

PATENT NO. : 4,921,377
DATED : May 1, 1990
INVENTOR(S) : Norman J. Hoch and Arno Rabin It is certified that error appears in the above-identified patent and that said Letters Patent is hereby corrected as shown below:

ON TITLE PAGE:                      left hand column, line numbered [76] cancel:

"both of Hi-Tech Industries, Inc., 21850 Wyoming Pl., Oak Park, Mich. 48237"

and substitute

--residing respectively at 1748 Wiltshire, Berkley, Mich. 48072 and 629 Snowmass, Rochester Hills, Mich. 48309--.

Signed and Sealed this

Thirteenth Day of August, 1991

*Attest:*

HARRY F. MANBECK, JR.

*Attesting Officer*        *Commissioner of Patents and Trademarks*